United States Patent
Thoreson et al.

(10) Patent No.: US 11,253,895 B2
(45) Date of Patent: Feb. 22, 2022

(54) METHODS FOR REMEDIATING CONTAMINATED SOIL AND GROUNDWATER USING SOLID-PHASE ORGANIC MATERIALS

(71) Applicant: REGENESIS BIOREMEDIATION PRODUCTS, San Clemente, CA (US)

(72) Inventors: Kristen A. Thoreson, San Clemente, CA (US); Scott B. Wilson, San Clemente, CA (US); John Freim, San Clemente, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 427 days.

(21) Appl. No.: 16/237,448

(22) Filed: Dec. 31, 2018

(65) Prior Publication Data

US 2019/0201951 A1 Jul. 4, 2019

Related U.S. Application Data

(60) Provisional application No. 62/613,325, filed on Jan. 3, 2018.

(51) Int. Cl.
| | |
|---|---|
| *B09C 1/00* | (2006.01) |
| *B09C 1/10* | (2006.01) |
| *C02F 3/34* | (2006.01) |
| *B09C 1/02* | (2006.01) |

(52) U.S. Cl.
CPC .............. *B09C 1/002* (2013.01); *B09C 1/00* (2013.01); *B09C 1/007* (2013.01); *B09C 1/025* (2013.01); *B09C 1/10* (2013.01); *B09C 1/105* (2013.01); *C02F 3/341* (2013.01); *B09C 2101/00* (2013.01)

(58) Field of Classification Search
CPC ........... B09C 1/002; B09C 1/00; B09C 1/007; B09C 1/025; B09C 1/10; B09C 1/105; B09C 2101/00; C02F 3/341
USPC ...................................................... 435/262.5
See application file for complete search history.

(56) References Cited

U.S. PATENT DOCUMENTS

| | | |
|---|---|---|
| 2,509,777 A | 5/1950 | McMillan et al. |
| 3,286,475 A | 11/1966 | Adams |
| 3,785,852 A | 1/1974 | Schleidt |
| 4,033,894 A | 7/1977 | McLaughlin et al. |
| 4,168,924 A | 9/1979 | Draper et al. |
| 4,211,822 A | 7/1980 | Kurfman et al. |
| 4,504,528 A | 3/1985 | Zucker et al. |
| 4,664,809 A | 5/1987 | Fenton et al. |
| 5,006,250 A | 4/1991 | Roberts et al. |
| 5,217,616 A | 6/1993 | Sanyal et al. |
| 5,266,213 A | 11/1993 | Gillham |
| 5,395,419 A | 3/1995 | Farone et al. |
| 5,514,279 A | 5/1996 | Blowes et al. |
| 5,580,770 A | 12/1996 | DeFilippi |
| 5,591,118 A | 1/1997 | Bierck |
| 6,420,594 B1 | 7/2002 | Farone et al. |
| 6,592,294 B1 | 7/2003 | Moore |
| 6,596,190 B1 | 7/2003 | Igawa et al. |
| 6,806,078 B2 | 10/2004 | Newman |
| 7,045,339 B2 | 5/2006 | Sorenson et al. |
| 7,101,115 B2 | 9/2006 | Luthy et al. |
| 7,160,471 B2 | 1/2007 | Looney et al. |
| 7,395,863 B2 | 7/2008 | Wang et al. |
| RE40,448 E | 8/2008 | Borden et al. |
| 7,585,132 B2 | 9/2009 | Imbrie |
| 7,845,883 B1 | 12/2010 | Siler, III et al. |
| 7,963,720 B2 | 6/2011 | Hoag et al. |
| 7,985,460 B2 | 7/2011 | Polk |
| 8,591,605 B2 * | 11/2013 | Misra ...................... C10L 1/026 44/307 |

(Continued)

FOREIGN PATENT DOCUMENTS

| | | |
|---|---|---|
| WO | 9849106 | 11/1998 |
| WO | WO2014091512 | 6/2014 |
| WO | WO2015123569 | 8/2015 |

OTHER PUBLICATIONS

Mackenzie et al., "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), p. 38'9, col. 2. para 2; p. 3820, col. 1, para 4; p. 3822, col. 2, para 2-3; abstract.

Committee on Future Options for Management in the Nation's Subsurface Remediation Effort et al.; Prepublication Copy of Alternatives for Managing the Nation's Complex Contaminated Groundwater Sites; 2012; 339 pages; National Academy of Sciences; The National Academies Press; Washington, D.C.; US.

Young, Lee W.; International Search Report; PCT/US 15/15899; dated Jan. 15, 2015; 8 pages.

Young, Lee W.; International Search Report; PCT/US 14/494,468; dated Aug. 2, 2013; 9 pages.

(Continued)

*Primary Examiner* — Michael L Hobbs
*Assistant Examiner* — Lenora A Abel
(74) *Attorney, Agent, or Firm* — Stetina Brunda Garred & Brucker

(57) ABSTRACT

Systems and methods for treating contaminated soil and groundwater are contemplated. An aqueous slurry may be formulated from particles of solid-phase organic materials having particle sizes between 0.1 and 100 microns, which serve as organic electron donors which may biodegrade subsurface contaminants. The aqueous slurry is injected into an environmental subsurface at a pressure lower than the fracture pressure of the subsurface, which will result in a more uniform distribution of the slurry throughout the subsurface, rather than concentrated deposition of the solid-phase organic materials at points along the fractures, and will also tend to reduce disruption of the architecture of the soil matrix, increasing the utility of the remediated soil and preventing an increase in the rates of generation and efflux of methane and nitrous oxide from the soil to the atmosphere.

17 Claims, No Drawings

(56) References Cited

U.S. PATENT DOCUMENTS

| | | | |
|---|---|---|---|
| 8,748,331 | B2 | 6/2014 | Talley et al. |
| 8,986,545 | B2 | 3/2015 | Kolhatkar |
| 9,393,602 | B2* | 7/2016 | Borden .................. B09C 1/10 |
| 2002/0048807 | A1* | 4/2002 | Lehr .................... B09C 1/002 |
| | | | 435/262.5 |
| 2003/0047507 | A1 | 3/2003 | Hou et al. |
| 2004/0031223 | A1 | 2/2004 | Durning et al. |
| 2004/0195182 | A1 | 10/2004 | Elliott |
| 2004/0249025 | A1 | 12/2004 | Dean |
| 2005/0263460 | A1 | 12/2005 | Farone et al. |
| 2005/0282390 | A1 | 12/2005 | Bian et al. |
| 2006/0054570 | A1 | 3/2006 | Block et al. |
| 2006/0088498 | A1 | 4/2006 | Martin et al. |
| 2006/0196850 | A1 | 9/2006 | Roh et al. |
| 2006/0275887 | A1* | 12/2006 | Miller .................. B09C 1/105 |
| | | | 435/262.5 |
| 2007/0297858 | A1 | 12/2007 | Imbrie |
| 2008/0008535 | A1 | 1/2008 | Ball |
| 2008/0125334 | A1 | 5/2008 | Burns et al. |
| 2008/0176943 | A1 | 7/2008 | Kaiser et al. |
| 2009/0197042 | A1 | 8/2009 | Polk |
| 2010/0274069 | A1* | 10/2010 | Kumar .................. B09C 1/10 |
| | | | 588/405 |
| 2013/0058724 | A1 | 3/2013 | John et al. |
| 2015/0034559 | A1 | 2/2015 | Mork et al. |
| 2017/0182532 | A1 | 6/2017 | Thoreson et al. |

OTHER PUBLICATIONS

Copenheaver, Blaine R.; International Search Report; PCT/US2011/058388; dated Feb. 17, 2012; 6 pages.

Young, Lee W.; International Search Report; PCT/US 18/32145; dated Aug. 1, 2018; 10 pages.

Young, Lee W.; International Search Report; PCT/US 18/32392; dated Aug. 7, 2018; 10 pages.

Thomas, Shane; International Search Report; PCT/US17/22795; dated Jun. 9, 2017; 15 pages.

Copenheaver, Blaine R.; International Search Report; PCT/US2017/037242; dated Aug. 7, 2017; 13 pages.

Thomas, Shane; International Search Report; PCT/US19/12071; dated Mar. 8, 2019; 8 pages.

Kim, Min Suk, et al.; The effectiveness of spent coffee grounds and its biochar on the amelioration of heavy metals-contaminated water and soil using chemical and biological assessments; May 14, 2014; 10 pages; Journal of Environmental Management 146 (2014) 124-130.

Yang, Zhanbiao, et al.; Metal availability, soil nutrient, and enzyme activity in response to application of organic amdendments in Cd-contaminated soil; Aug. 8, 2017; 11 pages; Enviro Sci Pollut Res; Springer-Verlag GmbH Germany, part of Spring Nature 2017.

Careghini et al.; Biobarriers for groundwater treatment: a review; 2013; 16 pages, Water Science & Technology (67.3); https://iwaponline.com/wst/article-pdf/67/3/453/441526/453.pdf.

Young, Lee; International Search Report; PCT/US13/64153; dated Dec. 13, 2013; 6 pages.

* cited by examiner

METHODS FOR REMEDIATING CONTAMINATED SOIL AND GROUNDWATER USING SOLID-PHASE ORGANIC MATERIALS

CROSS-REFERENCE TO RELATED APPLICATIONS

This application relates to and claims the benefit of U.S. Provisional Application No. 62/613,325 filed Jan. 3, 2018 and entitled "OIL CONTAINING MATTER FOR SOIL AND GROUNDWATER REMEDIATION," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to the field of in-situ remediation of contaminants present in soil and groundwater. More particularly, the present disclosure relates to improved systems and methods for bioremediation of contaminants using solid-phase organic materials.

2. Related Art

Pollution in soil and groundwater stemming from industrial compounds is a vast problem. Common contaminants can include petroleum-based compounds such as fuels and benzene, as well as industrial solvents such as chlorinated hydrocarbons, pesticides, fertilizers, etc. The excessive use, improper handling, and improper storage of these types of compounds can result in spills and leaching into soil and groundwater.

Over the past few decades, many methods have been developed to remediate these subsurface contaminants. A widely used method involves the application of materials that promote the biodegradation of the compounds. In the case of chlorinated hydrocarbons, many pesticides, nitrates, and perchlorates which can biodegrade under reducing conditions, the process requires the addition of substances that can act as electron donors. In many cases, the electron donors are fermentable materials that result in the production of molecular hydrogen which can be utilized by the bacteria to metabolize the contaminants of concern.

Many water-soluble, liquid-phase, and liquid-in-liquid emulsion materials can be directly applied via injection or recirculation through permanent or temporary wells and are currently utilized as organic electron donors to promote bioremediation. Examples of liquid-phase materials include vegetable oils and polylactates, which are described by U.S. Pat. No. 6,520,594 to Farone et al., examples of liquid-in-liquid emulsions include emulsified vegetable oils, and are described in U.S. Pat. No. RE40,734 to Borden et al., and examples of water-soluble materials include lactic acids, described in U.S. Pat. No. 7,045,338 to Sorenson et al. Solid-phase materials are another source of electron donors. These are appealing because they exhibit limited transport with natural groundwater flow so they will not be readily washed away. Also, compared to liquid-phase, liquid-in-liquid emulsions, and water-soluble products, solid-phase electron donors are sparingly soluble. These inherent properties can result in an extended degradation timeframe that can eliminate or lessen the need for repeated injection events.

Solid-phase organic electron donors are also appealing due the ability to utilize renewable resources and industrial or municipal waste materials such as vegetables, plants, and tree mulches, described by Haas et al. in *In Situ Biowall Containing Organic Mulch Promotes Chlorinated Solvent Bioremediation*, Proceedings, Second International Conference on Remediation of Chlorinated and Recalcitrant Compounds (Monterey, Calif., May) 4; 71-76, 2000, and by Caregheni et al. in *Biobarriers for groundwater treatment: a review*, Water Sci. & Tech, 67.3, 2013. Many of these waste materials are beneficial because they are known to contain oils, hydrogenated oils, triglycerides, and fatty acids, like those used in the water-soluble and liquid-phase applications mentioned above. Examples of solid-phase organic materials include hydrogenated vegetable oils, spent coffee seeds, described by U.S. Pat. No. 8,591,605 to Mirsa et al., and nut shells, described by Tsamba in *Multiple uses of cashew nut shells as solid and liquid biofuel*. Joint Conference: International Thermal Treatment Technologies (IT3) and Hazardous Waste Combustors (HWC), 183, 435-440 (2009).

However, solid-phase materials are generally thought to be of limited applicability, as that they are typically large and rigid and thus cannot be readily injected into and distributed within the subsurface. Instead they are usually installed in trenches, typically called biowalls, or physically mixed into the subsurface. These trenching and mixing processes, however, can be expensive and disruptive to implement, and poses substantial problems for remediation of built-up environments.

Solid products can also be injected into soil, which previously has been performed using high pressure injection techniques. Some benefits of injection techniques are that they are generally less expensive and disruptive to perform relative to physical installation or mixing into the subsurface. However, the injection of solid products at high pressures has a tendency to disrupt the architecture of the soil matrix by generating fractures and similar preferential sub-surface pathways. Because of this, high-pressure injection processes typically result in a non-uniform placement of the injected solid phase material within fractures, channels, or similar pathways that develop as a result of the injection process, rather than a preferred uniform distribution. The disruption of the architecture of the soil matrix may also negatively contribute to the overall health and utility of the soil, as such disruption may decrease the stability and cohesion of the soil, thus increasing the tendency of the soil to erode and negatively affecting the ability of the soil matrix components to carry out its natural biochemical processes. Importantly, the rates of the biogeochemical cycling processes of carbon and nitrogen are directly tied to the stability of the soil matrix, which serves an important sink for many greenhouse gases. The destabilization of the soil matrix can result in, among other things, higher rates of generation and efflux of methane and nitrous oxide into the atmosphere.

It would therefore be desirable to be able to inject solid-phase organic materials into an environmental subsurface in a manner which does not suffer the drawbacks of conventional high-pressure injection techniques.

BRIEF SUMMARY

To solve these and other problems, a method for biore-mediating environmental contaminants present in an environmental subsurface is contemplated, wherein an aqueous slurry is provided which comprises particles of a solid-phase organic material having a mean particle size across all dimensions ranging from 0.1 to 20 microns, and applying the aqueous slurry to the subsurface at a pressure lower than the fracture of the subsurface. The solid-phase organic material may be present in the aqueous slurry in an amount between 0.1 and 50% by weight, preferably in an amount between 0.2 and 40% by weight, and more preferably, in an amount between 0.4 and 25% by weight.

The solid phase organic material may comprise one or more of: seeds, fruit pit, nutshells, fruits, bioplastics, or combinations thereof. In instances in which the solid-phase organic material is a fruit pit, the solid phase organic material may comprise, for example, one or more of: coffee beans, extracted coffee grounds, olive pits, apricot pits, cherry pits, peach pits, nectarine pits, plum pits, or combinations thereof. In instances in which the solid phase-organic material is a seed, the solid-phase organic material may comprise, for example, one or more of: rapeseeds, cottonseeds, sesame seeds, pumpkin seeds, sunflower seeds, canola seeds, soybean seeds, grape seeds, date seeds, or combinations thereof. The organic material can also comprise solid-phase hydrogenated oils derived from the aforementioned organic products, or other solid-phase hydrogenated materials, which may or may not be components of hydrogenated vegetable oils, such as hydrogenated fatty acids or hydrogenated triglycerides. In instances in which the solid phase-organic material is a bioplastic, the solid-phase organic material may comprise, for example, one or more of: a cellulose-based bioplastic, a protein-based bioplastic, a bio-derived polyethylene, a bio-derived polyurethane, a bio-derived polyester, or combinations thereof. In instances in which the solid phase-organic material is a bio-derived polyester, the solid-phase organic material may comprise, for example, one or more of: poly-D-lactide, poly-L-lactide, poly-DL-lactide, poly-3-hydroxybutyrate, a polyhydroxyalkanoate, or combinations thereof.

The aqueous slurry may further comprise a distribution enhancement agent. The distribution enhancement agent may comprise, for example, one or more of: a chelating agent, an anionic polymer, a cationic surfactant, an anionic surfactant, a zwitterionic surfactant, a nonionic surfactant, or combinations thereof.

The aqueous slurry may further comprise a remediation enhancement agent. The distribution enhancement agent may comprise, for example, one or more of a microorganism, a bacterium, molecular hydrogen, a molecular hydrogen-releasing substance, a nutrient, a micronutrient, ethanol, cellulose, a sorbent, a pH buffer, a protein, a zero-valent metal, a mineral, or combinations thereof.

In the aqueous slurry, the particles of the solid-phase organic material may have a mean particle size of at least 0.5 microns across at least one dimension, and may have also a mean particle size across all dimensions ranging from 0.5 to 25 microns. The majority of the particles of the solid-phase organic material may also have a particle size of less than 25 microns across its largest dimension.

DETAILED DESCRIPTION

According to various aspects of the present disclosure, new systems and methods for bioremediating contaminated soil and groundwater are contemplated. According to an exemplary embodiment, an aqueous slurry containing particles of a solid-phase organic material is provided, the solid phase organic material being present in the aqueous slurry in an amount between 0.1% and 50% by weight, with the mean particle size of the particles of the solid-phase organic material being from 0.1 to 100 microns across all dimensions, and more preferably between 0.5 and 25 microns, with the majority of the particles having a particle size of less than 25 microns across its largest dimension. The aqueous slurry also may contain a distribution enhancement agent, and/or a further remediation enhancement agent. The aqueous slurry is then injected into an environmental subsurface at a pressure lower than the fracture pressure of the subsurface.

The concept of generating fractures in geological media via the injection of a liquid is well known, and serves as the foundation for the technique of hydrauling fracturing. In order for fractures to be generated, the pressure of injection must result in a propagated in-situ local pressure greater than the fracture pressure of the geological media at the location where the fracture will occur.

Numerous complex models have been developed for estimating and simulating the native stresses within subsurface materials during the hydraulic fracturing process. Hydraulic fracturing has been used for more than 50 years to enhance the yield of wells recovering oil at great depths (typically involving rock) and more recently these techniques have been applied to the creation of fractures in soils such as silts, sands and clays for the purpose of enhancing the mass transfer of contaminants via increasing the effective permeability, thus potentially promoting certain types of in-situ soil remediation.

A substantial amount of land which will be subject to environment remediation efforts sits in the unsaturated vadose zone above the water table. Unsaturated soil is generally analyzed as a 3-phase system composed of solids (soil particles), water, and air. When a load is applied to soil, that load is transmitted to both the water and the solid grains within the soil. The strength and compressibility of the soil depends on the effective stresses within the soil. A fracture in soil will typically occur when the shear strength of the soil is exceeded by the hydraulic pressure of the fluid injected into the soil.

In soil mechanics, there are a number of theories used to predict the shear strength of soil across a number of possible soil conditions, such as the Tresca theory and the Mohr-Coulomb theory. There are also a number of factors which are also taken into consideration in modeling how a soil will shear, such as the soil composition (mineralogy, grain size and size distribution, grain shape, pore fluid type and content, ionic content, etc.), the soil state (void ratio, effective normal stress and shear stress), the soil structure, and the loading conditions (magnitude, rate, etc.). Presently, these and other theories are subject to substantial debate in the field as to which best predict soil behavior when placed under hydraulic loads.

Experimentally, it has generally been found that at the depths of the unsaturated vadose zone above the water table, most soils will have a fracture initiation pressure between 50 and 500 kPa, and for typical compacted soils above the water table at depths between 3 and 25 feet the fracture initiation pressure will be between around 125 and 300 kPa. Needless to say, however, in real world practice, once the fracture pressure of a specific subsurface has been exceeded, it is usually evident from the instruments at the injection bore. By maintaining the injection pressure at a level lower than the fracture pressure of the subsurface, which one of skill in the art would be able to determine, the above discussed advantages of non-disruption of the soil subsurface may thus be realized.

Remediation of soil and groundwater by promoting the biodegradation of contaminants using solid-phase organic materials is described as follows: First one or more contaminants in the soil and/or groundwater must be identified. The presently contemplated method specifically relates to those contaminants that can be biodegraded under electrochemically reducing conditions, requiring an organic electron donor to promote biodegradation. Examples of these contaminants include, but are not limited to, halogenated hydrocarbons, such as perchloroethene, trichloroethene, dichloroethene and vinyl chloride, pesticides, nitrates, perchlorates, nitramides, and nitrotoluenes.

Once the contamination is identified, the subsurface is then treated with an aqueous based slurry containing at least one solid-phase organic material, where the mean particle size of the particles of the solid-phase organic material has at least one dimension of at least 0.1 microns, and a mean particle size of its largest dimension of less than 100 microns. Preferably, the particles of the solid phase organic material may have a mean particle size of at least 0.5 microns across at least one dimension. Preferably as well, the particles of the solid-phase organic material may have a mean particle size across all dimensions ranging from 0.5 to 25 microns, and a majority of the particles of the solid-phase organic material may have a particle size of less than 25 microns across its largest dimension.

The treatment may be applied using conventional application methods such as injection, percolation, or gravity feed. In all cases, the application is performed at pressures that are below the fracture pressure of the subsurface. The application concentration of the aqueous based slurry preferably contains between 0.1 and 50% by weight of the solid-phase organic material, more preferably between 0.2 and 40%, and even more preferably between 0.4 and 25%.

The solid-phase, organic material used in the treatment may preferably be selected or derived from renewable or waste materials, and preferably may be food waste. Examples of such waste materials may include, but are not limited to, plant and tree seeds, nut shells, fruits, and fruit pits including raw coffee beans, spent (extracted) coffee grounds, avocado pits, rapeseeds, cottonseeds, corn kernels, grape seeds, pumpkin seeds, sunflower seeds, sesame seeds, soybeans, olive pits, date seeds, almonds, peanuts, pine nuts, walnuts, pistachio shells, walnut shells, and combination thereof. Examples of renewable solid-phase organic materials include hydrogenated vegetable oils and vegetable waxes. These may include materials made from hydrogenated oils of soybean, palm, coconut, castor, rapeseed, linseed, canola, peanut and mixtures thereof. Further examples of renewable organic solid-phase materials include polyesters such as racemic polylactic acid (poly-DL-lactide), poly-L-lactide, poly-D-lactide, and other biodegradable polymers such as bioplastics, which may include, for example but without limitation, cellulose-based bioplastics, protein-based bioplastics, a bio-derived polyethylene, a bio-derived polyurethane, or combinations thereof. Aside from polylactic acids, other bio-derived polyesters which may be utilized include poly-3-hydroxybutyrate, a polyhydroxyalkanoate, among others.

The aqueous slurry may further comprise a distribution enhancement agent which may be operative to facilitate the ability of the aqueous slurry to become distributed and dispersed about a matrix of soil and groundwater. Preferably, the distribution enhancement agent will include one or more agents selected from the group consisting of: a chelating agent, an anionic polymer, an anionic surfactant, a zwitterionic surfactant, a nonionic surfactants, or combinations thereof. However, it may be seen that any agent may be utilized which is operative to facilitate the ability of the aqueous slurry to become distributed and dispersed about the contaminated environment.

The aqueous slurry may further comprise a remediation enhancement agent which may serve to further promote the remediation of the environmental subsurface where the aqueous slurry is applied. Preferably, the remediation enhancement agent comprises one or more of: a microorganism, a bacterium, molecular hydrogen, a molecular hydrogen-releasing substance, a nutrient, a micronutrient, ethanol, cellulose, a sorbent, a pH buffer, a protein, a zero-valent metal, a mineral, or combinations thereof. However, it may be seen that any agent may be utilized which is operative to facilitate the operability of the aqueous slurry to remediate the contaminated environment.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A method for bioremediating environmental contaminants present in an environmental subsurface, the method comprising the steps of:
   providing an aqueous slurry, the aqueous slurry comprising particles of a solid-phase organic material having a mean particle size across all dimensions ranging from 0.1 to 100 microns, the aqueous slurry not comprising any solid alkaline material; and
   injecting the aqueous slurry into the subsurface at a pressure lower than that the fracture pressure of the subsurface.

2. The method of claim 1, wherein the solid-phase organic material is present in the aqueous slurry in an amount between 0.1 and 50% by weight.

3. The method of claim 2, wherein the solid-phase organic material is present in the aqueous slurry in an amount between 0.2 and 40% by weight.

4. The method of claim 3, wherein the solid-phase organic material is present in the aqueous slurry in an amount between 0.4 and 25% by weight.

5. The method of claim 1, wherein the solid-phase organic material comprises one or more of: seeds, fruit pits, nut shells, fruits, bioplastics, hydrogenated vegetable oils, hydrogenated fatty acids, hydrogenated triglycerides, or combinations thereof.

6. The method of claim 5, wherein the solid-phase organic material is a fruit pit, and comprises one or more of: coffee beans, extracted coffee grounds, olive pits, apricot pits, cherry pits, peach pits, nectarine pits, plum pits, or combinations thereof.

7. The method of claim 5, wherein the solid-phase organic material is a seed, and comprises one or more of: rapeseeds, cottonseeds, sesame seeds, pumpkin seeds, sunflower seeds, grape seeds, date seeds, or combinations thereof.

8. The method of claim 5, wherein the solid-phase organic material is a bioplastic, and comprises one or more of: a cellulose-based bioplastic, a protein-based bioplastic, a bio-derived polyethylene, a bio-derived polyurethane, a bio-derived polyester, or combinations thereof.

9. The method of claim 8, wherein the solid-phase organic material is a bio-derived polyester, and comprises one or more of: poly-D-lactide, poly-L-lactide, poly-DL-lactide, poly-3-hydroxybutyrate, a polyhydroxyalkanoate, or combinations thereof.

10. The method of claim 5, wherein the solid-phase organic material is a hydrogenated vegetable oil, and comprises one or more of: hydrogenated soybean oil, hydrogenated coconut oil, hydrogenated palm oil, hydrogenated castor oil, hydrogenated rapeseed oil, hydrogenated linseed oil, hydrogenated canola oil, hydrogenated peanut oil, or combinations thereof.

11. The method of claim 1, wherein the aqueous slurry further comprises a distribution enhancement agent.

12. The method of claim 11, wherein the distribution enhancement agent comprises one or more of: a chelating agent, an anionic polymer, a cationic surfactant, an anionic surfactant, a zwitterionic surfactant, a nonionic surfactant, or combinations thereof.

13. The method of claim 1, wherein the aqueous slurry further comprises a remediation enhancement agent.

14. The method of claim 13, wherein the remediation enhancement agent comprises one or more of: a microorganism, a bacterium, molecular hydrogen, a molecular hydrogen-releasing substance, a nutrient, a micronutrient, ethanol, cellulose, a sorbent, a buffer, a protein, a zero-valent metal, a mineral, or combinations thereof.

15. The method of claim 1, wherein in the aqueous slurry, the particles of the solid-phase organic material have a mean particle size of at least 0.5 microns across at least one dimension.

16. The method of claim 1, wherein in the aqueous slurry, the particles of the solid-phase organic material have a mean particle size across all dimensions ranging from 0.5 to 25 microns.

17. The method of claim 1, wherein in the aqueous slurry, the majority of the particles of the solid-phase organic material have a particle size of less than 25 microns across its largest dimension.

* * * * *